US011153681B2

(12) United States Patent
Lee et al.

(10) Patent No.: US 11,153,681 B2
(45) Date of Patent: Oct. 19, 2021

(54) ACOUSTIC DIRECTION SENSOR

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 50 days.

(21) Appl. No.: 16/662,475

(22) Filed: Oct. 24, 2019

(65) Prior Publication Data
US 2021/0127201 A1   Apr. 29, 2021

(51) Int. Cl.
| H04R 1/28 | (2006.01) |
| H04R 1/40 | (2006.01) |
| H04R 1/32 | (2006.01) |
| G10K 11/16 | (2006.01) |
| H04R 19/04 | (2006.01) |
| G10K 11/36 | (2006.01) |

(52) U.S. Cl.
CPC .......... *H04R 1/406* (2013.01); *G10K 11/16* (2013.01); *G10K 11/36* (2013.01); *H04R 1/323* (2013.01); *H04R 19/04* (2013.01); *G10K 2210/32272* (2013.01)

(58) Field of Classification Search
CPC .......... H04R 1/28; H04R 1/2815–2826; H04R 1/2869; H04R 1/2873
USPC .................................................. 381/346–354
See application file for complete search history.

(56) References Cited

U.S. PATENT DOCUMENTS

| 6,064,746 A * | 5/2000 | Nakamura | H04R 17/00 310/324 |
| 8,126,183 B2 * | 2/2012 | Enstad | H04R 1/34 381/360 |
| 9,843,858 B1 | 12/2017 | Karunasiri et al. | |
| 2002/0009202 A1 * | 1/2002 | Sheplak | G10K 11/172 381/71.5 |
| 2005/0117767 A1 * | 6/2005 | Ito | H04R 1/2849 381/333 |
| 2005/0123162 A1 * | 6/2005 | Huffman | H04R 1/2826 381/337 |

(Continued)

FOREIGN PATENT DOCUMENTS

KR        20190067289 A       6/2019

OTHER PUBLICATIONS

Ruffier et al. "A tiny directional sound sensor inspired by crickets designed for Micro-Air Vehicles", Institute of Electrical and Electronics Engineers 23rd international Conference on Micro Electro Mechanical System, 2011, France (4 pages).

(Continued)

*Primary Examiner* — Suhan Ni
(74) *Attorney, Agent, or Firm* — Christopher G. Darrow; Darrow Mustafa PC

(57) ABSTRACT

Sound direction detection devices include cylinders or other longitudinally extended structures having rotational symmetry about their longitudinal axes and multiple, rotationally equivalent resonators contained therein. Each resonator contains a microphone or other transducer that is activated when the resonator resonates.

15 Claims, 4 Drawing Sheets

(56) References Cited

U.S. PATENT DOCUMENTS

2014/0328491 A1\* 11/2014 Slotte .................. H04R 1/2811
 381/74
2019/0072635 A1 3/2019 Kang et al.

OTHER PUBLICATIONS

Wilmott et al. "Bio-Inspired Miniature Direction Finding Acoustic Sensor", Scientific Reports 6, 29957, Jul. 21, 2016 (8 pages).
Yi et al. "Subwavelength angle-sensing photodetectors inspired by directional hearing in small animals", Nature Nanotechnology, vol. 13, Dec. 2018 (6 pages).
Nguyen et al., "Sound Direction Sensor with an Acoustic Channel" 2010 IEEE, The University of Tokyo, Japan, pp. 655-658.

\* cited by examiner

ACOUSTIC DIRECTION SENSOR

TECHNICAL FIELD

The present disclosure generally relates to acoustic resonance devices and, more particularly, to such devices for the detection of the incident angle of acoustic waves.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Sensing of the incident angle of acoustic waves is required for many applications, such as applications involving the localization of a sound source. Systems for sensing acoustic incident angle usually measure the difference in sound wave arrival time, or phase difference, at two or more spaced-apart microphones. A significant disadvantage of this approach is that it generally requires a substantial distance between the multiple microphones, making it very difficult to use a compact design. Thus, such phase-difference acoustic direction sensing systems are very difficult to adapt to applications requiring, or benefiting from, a small size.

Accordingly, it would be desirable to provide an improved system for sensing or detecting acoustic wave incident direction that does not require a significant spatial distance between multiple microphones. Such a system would be amenable to smaller designs and more compact utilizations.

SUMMARY

This section provides a general summary of the disclosure, and is not a comprehensive disclosure of its full scope or all of its features.

In various aspects, the present teachings provide a sound direction sensor. The sound direction sensor comprises a cylinder having first and second Helmholtz resonators. Each of the first and second Helmholtz resonators has at least one exterior wall defining an acoustic chamber and a neck placing the acoustic chamber in fluid communication with an ambient environment. The necks of the first and second Helmholtz resonators point in different directions, and each acoustic chamber contains an input sound transducer.

In other aspects, the present teachings provide an apparatus for detecting incident angle of an acoustic wave in three dimensions. The apparatus includes two devices of the type described above, positioned orthogonal to one another.

In still other aspects, the present teachings provide a sound direction sensor. The sensor comprises at least one exterior wall defining a hollow longitudinal structure having a longitudinal axis and n-fold rotational symmetry about the longitudinal axis, where n is an integer equal to or greater than two. The sensor further comprises n rotationally equivalent Helmholtz resonators contained in the hollow longitudinal structure. Each of the n rotationally equivalent Helmholtz resonators includes an acoustic chamber bounded by the at least one exterior wall; a neck placing the acoustic chamber in fluid communication with an ambient environment; and a microphone contained in the acoustic chamber.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide devices for detecting the incident angle of acoustic (sound) waves. A disclosed device can be substantially smaller than the wavelength of the detected acoustic wave, and therefore is amenable to compact utilizations. In some cases, an individual device can detect the incident angle in a two-dimensional wave plane, and two or more devices can be utilized to detect the incident angle in two orthogonal planes (i.e. in three dimensions).

A device of the present teachings has two Helmholtz resonators oriented in different, typically opposite, directions, and a transducer (e.g. microphone) disposed in the chamber of each resonator. Each resonator will resonate to the extent that an acoustic wave, at or near the resonance frequency, is incident on that resonator in its orientation direction. Each transducer will generate an electric signal in proportion to the resonance of its resonator. The orientation directions of the two resonators thus define a detection plane, and the incidence angle within the detection plane is determined by the power ratio of the transducers within the resonator chambers.

Figure 1A:
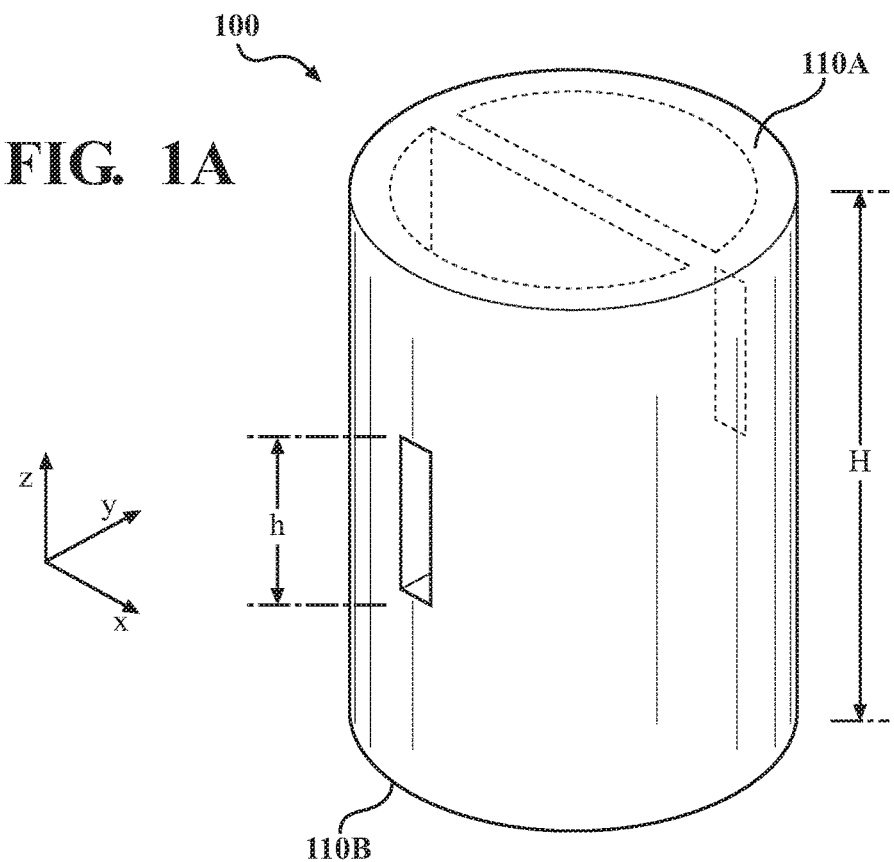
FIG. 1A is a perspective side view of a variation of an acoustic direction sensor of the present teachings, illustrating height of the sensor and height of an aperture in the sensor.
Figure 1B:
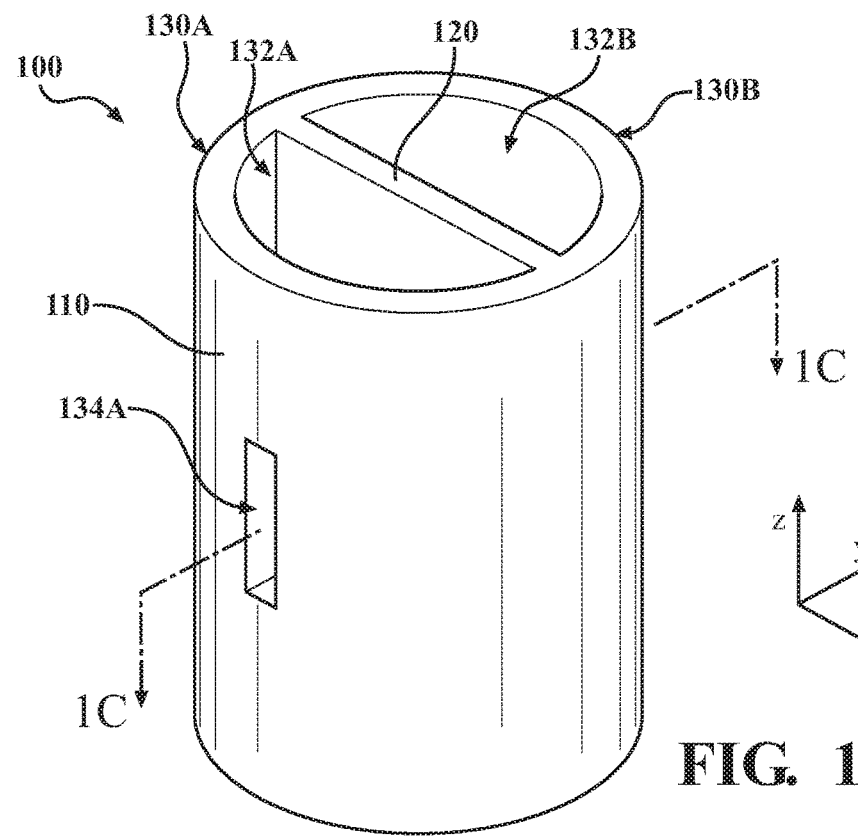
FIG. 1B is the perspective side view of the sensor of FIG. 1A, illustrating a pair of Helmholtz resonators contained in the sensor.
Figure 1C:
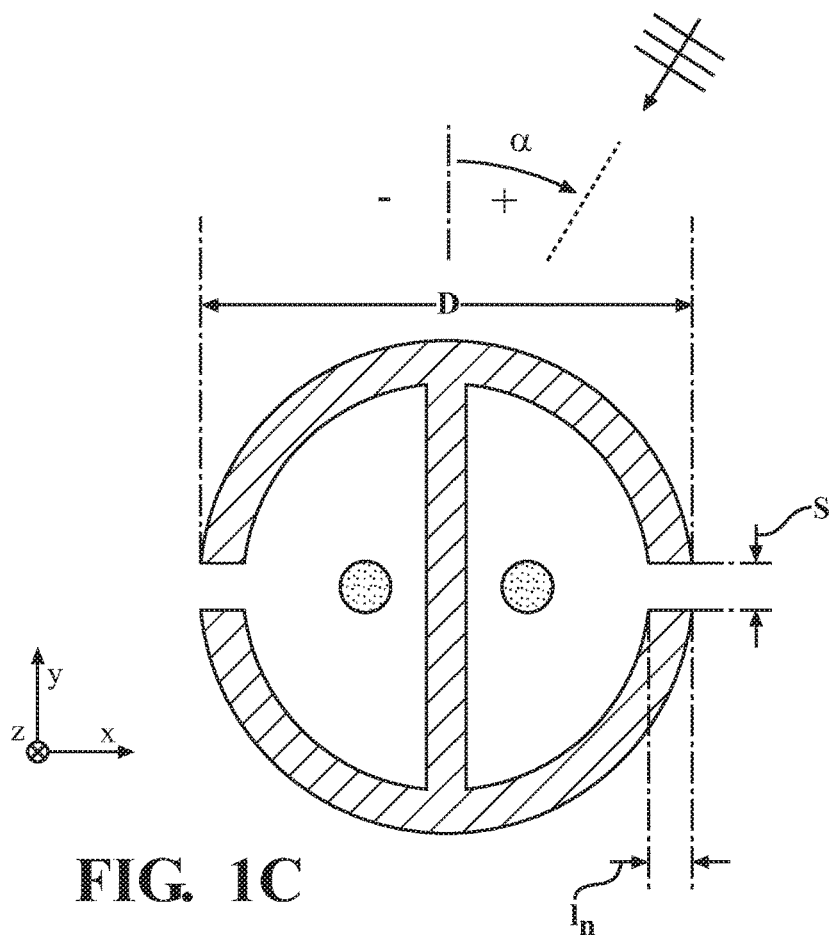
FIG. 1C is a top plan view of the sensor of FIGS. 1A and 1B, viewed along the line 1C-1C from FIG. 1B, and illustrating various dimensions of the resonators.
Figure 1D:
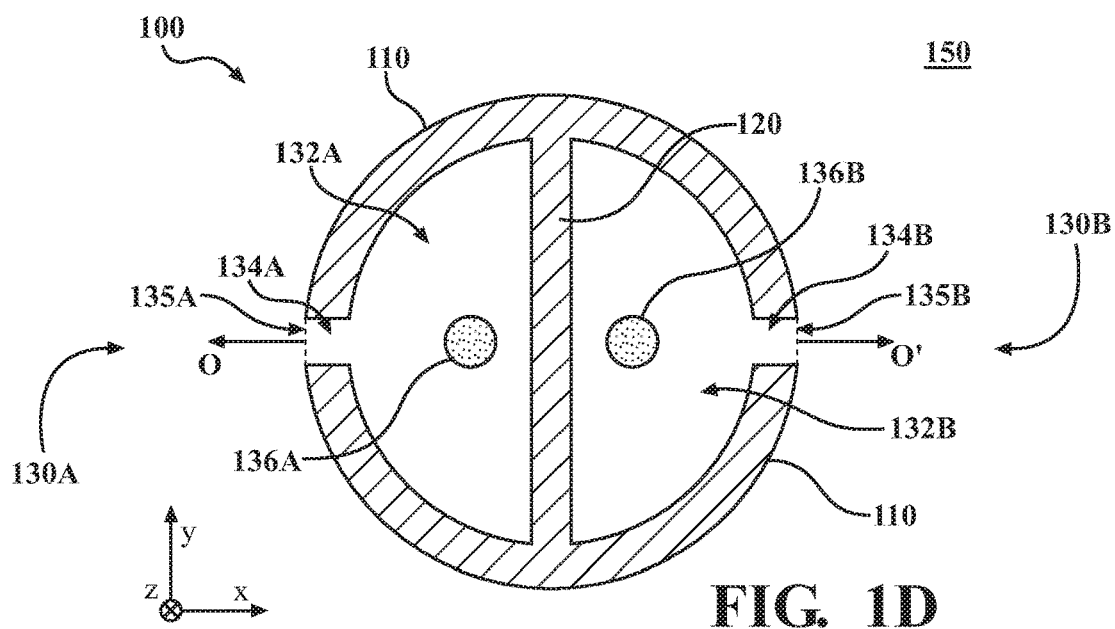
FIG. 1D is the view of FIG. 1C, illustrating structural features of the resonators and microphones contained therein.

FIGS. 1A and 1B are perspective views of an exemplary device 100 (alternatively referred to herein as a sensor 100), of the present teachings, for detection of the incident angle of an acoustic wave. FIGS. 1C and 1D are top plan views of the device 100 of FIGS. 1A-1B, viewed along the line 1C-1C of FIG. 1B. FIGS. 1A and 1C illustrate dimensions of the device 100 and FIGS. 1B and 1D illustrate various structural components of the device 100.

Focusing momentarily on FIG. 1D, the device 100 includes at least two Helmholtz resonators 130A, 130B. Each Helmholtz resonator includes a chamber 132A, 132B, and a neck 134A, 134B. Each neck 134A, 134B places its respective chamber 132A, 132B in fluid communication with the ambient environment 150. Each neck 134A, 134B further defines an entrance plane 135A, 135B, and a resonator orientation O, O' orthogonal to the entrance plane 135A, 135B of the resonator's neck 134A, 134B.

It will be noted that each resonator orientation O, O' is represented as a vector, having linearity and direction. In the example of FIGS. 1A-1D, the resonator orientations O, O' are collinear and opposing (i.e. pointing in opposite directions). In some variations, discussed further below, the at least two resonator orientations O, O' can be non-collinear but opposing; and in some variations the at least two resonator orientations O, O' can be neither collinear nor opposing. In all variations, the at least two resonator orientations will be in different directions from one another.

Focusing now particularly on FIGS. 1B and 1D, each of the acoustic chambers 132A, 132B is defined by at least one exterior wall 110. The at least one exterior wall can generally be formed of a rigid, acoustically reflective material, such as a rigid thermoplastic or a metal. In many implementations, the at least one exterior wall 110 will form an elongated structure such as a cylinder or equilateral polygonal prism, having a longitudinal axis and a lateral area. For example, in the case of a cylinder, the longitudinal axis is coincident with the cylindrical height, and the lateral area is coincident with a cross-sectional circle, or an end, of the cylinder. Because, in the example of FIGS. 1A-1D, the at least two Helmholtz resonators 130A, 130B are connected, and indeed constitute longitudinal halves of a shared cylinder, the acoustic chambers 132A, 132B of this example are further defined by an interior wall 120 separating the two chambers 132A, 132B from one another and the at least one exterior wall 110 is a single, contiguous wall surrounding both acoustic chambers 132A, 132B. In some variations, the at least two Helmholtz resonators may be physically separate from one another (i.e. non-contacting relative to one another) and thus the at least one exterior wall will, in such variations, constitute more than one exterior wall 110. It will be understood that, in many implementations, it will be preferable for the at least two Helmholtz resonators 130A, 130B to be physically connected to one another and contained within the same structure (e.g. the cylinder of FIGS. 1A-1D for maximum compactness, ease of manufacture, and/or ease of installation.

Each of the acoustic chambers 132A, 132B will be enclosed, aside from the neck 134A, 134B. Thus, in the example of FIGS. 1A-1D, each acoustic chamber 132A, 132B is further defined by end walls (top and bottom), but the top end wall is omitted from the view of FIGS. 1A and 1B to enable viewing of the device 100 interior. Each acoustic chamber 132A, 132B thus defines a contained volume defined by the product of the height, H, and the lateral area. In the case of the example of FIGS. 1A-1D, the lateral area of each acoustic chamber 132A, 132B is defined by equation 1:

$$A = \pi\left(\frac{D}{2}\right)^2; \qquad \text{Eq. 1}$$

and the contained volume of each acoustic chamber 132A, 132B is defined by equation 2:

$$V = H\pi\left(\frac{D}{2}\right)^2; \qquad \text{Eq. 2}$$

where H is the device 100 height and D is the device 100 diameter. It will be understood that the contained volume of each acoustic chamber 132A, 132B can be similarly calculated regardless of different shapes of the device, and regardless whether the chambers 132A, 132B are contained within the same exterior structure (e.g. the cylinder of FIGS. 1A-1D) or otherwise physically connected to one another.

In the example of FIGS. 1A-1D, each neck 134A, 134B is formed of an aperture in the at least one exterior wall 110. While the shape of said aperture is generally not prescribed, each neck 134A, 134B generally has a neck length, $l_n$, and a surface area, S, defined by equation 3:

$$S = wh \qquad \text{Eq. 3;}$$

where w and h are the neck (aperture) width and height, respectively. It will be understood that the neck 134A, 134B will not necessarily include a rectangular aperture, but might have a circular, ovoid, etc. surface area, and the surface area, S, can be determined accordingly.

It will thus be understood that each Helmholtz resonator 130A, 130B has a resonance frequency, $f_{res}$, defined by equation 4:

$$f_{res} = \frac{c}{2\pi}\sqrt{\frac{S}{Vl_n}}; \qquad \text{Eq. 4}$$

where c is the speed of sound in the ambient atmosphere 150.

Thus, when an incident wave at or near the resonance frequency, $f_{res}$, is incident on one of the at least one Helmholtz resonators 130A, 130B, that resonator will resonate. A device of the present teachings then includes a transducer 136A, 136B associated with each Helmholtz resonator 130A, 130B. Each transducer 136A, 136B is configured to generate an electronic signal in response to resonance of the Helmholtz resonator 130A, 130B with which it is associated. For example, in many implementations, the transducer 136A, 136B will be a microphone positioned inside the acoustic chamber 132A, 132B of its associated Helmholtz resonator 130A, 130B. Thus, and referring to FIG. 1D, the transducer/microphone 136A will generate an electronic signal when the Helmholtz resonator 130A resonates; and the transducer/microphone 136B will generate an electronic signal when the Helmholtz resonator 130B resonates.

It will generally be preferable that each transducer 136A, 136B generates an electronic signal only when its associated Helmholtz resonator 130A, 130B resonates, and not when an unassociated resonator resonates. Thus, for example, the transducer 136A will preferably generate an electronic signal when its associated Helmholtz resonator 130A resonates, but not generate an electronic signal (or generate only a minimal electronic signal) when another Helmholtz resonator 130B resonates. This is easily achieved in the case where a transducer 136A, 136B is a microphone placed in the acoustic chamber 132A, 132B of each Helmholtz resonator 130A, 130B, as resonance of any resonator 130A, 130B will produce sound inside the chamber 132A, 132B. In implementations in which the at least two Helmholtz resonators 130A, 130B are not in contact with one another, or not in mechanical communication, a transducer can alternatively be an accelerometer attached to a chamber wall 110 to generate an electronic signal in response to vibration, or any other suitable transducer.

Figure 2:
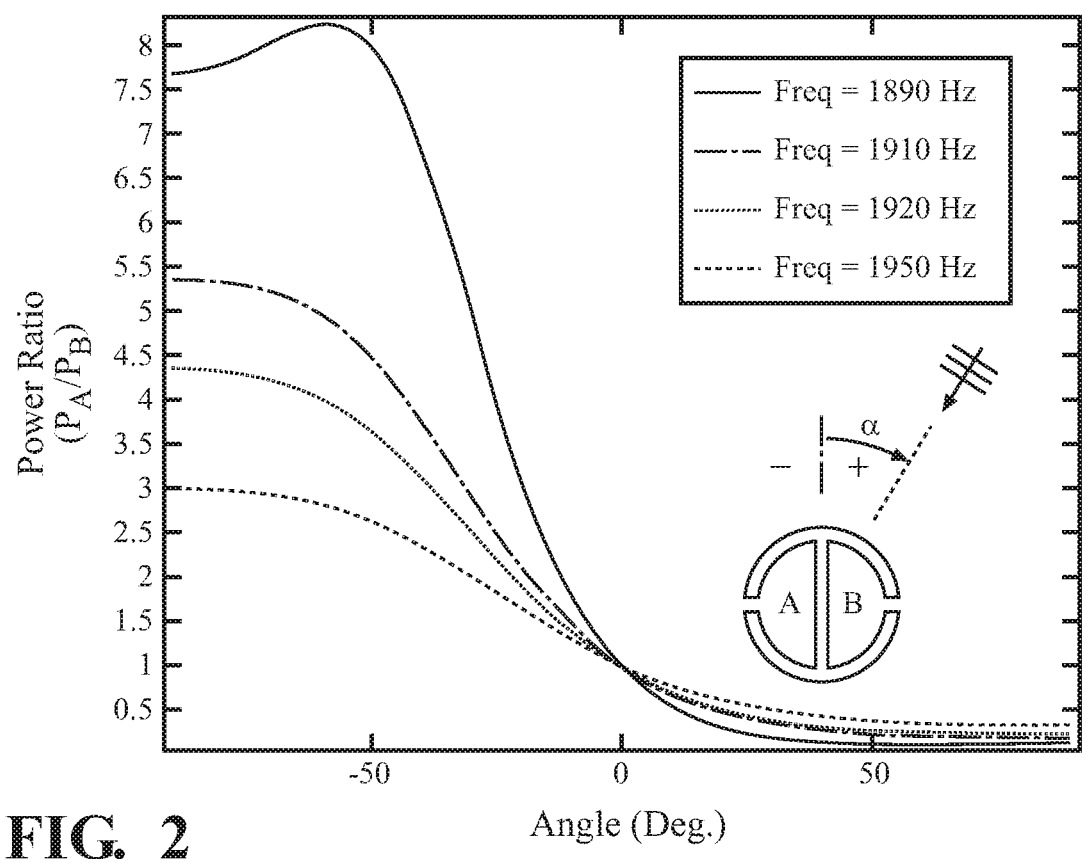
FIG. 2 is a graph of simulated acoustic power ratio as a function of incidence angle for a sensor of the type shown in FIGS. 1A-1D.

FIG. 2 shows a graph of simulated data indicating acoustic power ratio as a function of angle of incidence of an acoustic wave on the device 100 of FIGS. 1A-1D. In the simulation of FIG. 2, each of the first and second Helmholtz resonators has a resonance frequency, $f_{res}$, of 1890 Hz, and an angle of zero degrees as shown in the graph is defined as a sound incidence angle orthogonal to each resonator orientation O, O'. As indicated by the inset of FIG. 2, the two Helmholtz resonators 130A, 130B are labeled A and B, a negative incidence angle corresponds to an incident wave oriented nearer to the resonator A, and a positive incidence angle corresponds to an incident wave oriented nearer to the resonator B. As such, an incidence angle of −90° is parallel to the resonator orientation, O, of resonator A and an incidence angle of +90° is parallel to the resonator orientation, O', of resonator B.

It will be understood, and with reference to Equation 4, that dimensions of the device can be altered for differing applications and different desired resonance frequencies. In the case of the exemplary 1890 Hz resonance frequency of FIG. 2, H=25 mm, h=10 mm, D=20 mm, and w=1 mm. For 20 kHz resonance frequency, all dimensions can be one-tenth of those listed above. It will thus be understood that devices 100 of the present teachings can be quite small, such as on the low millimeter scale. In various implementations, a device 100 of the present teachings can have a maximum dimension (e.g. length) less than about fifty millimeters, or less than about ten millimeters.

As shown in FIG. 2, as the angle of incidence orients toward resonator A, the power ratio, $P_A/P_B$, increases, reaching a maximum at an incident angle of −90° at most frequencies. At 1890 Hz, the power ratio reaches a maximum at about −60° and then exhibits a modest dip and plateau to −90°. It will be understood that, in many implementations, it may be simpler to determine acoustic incidence angle when there is a continuous increase in power ratio with increasing angle up to −90° so that there are no instances of different angles with the same power ratio. For this reason, it may be preferable to monitor incidence angle for frequencies that fit this profile, such as frequencies greater than 1910 Hz in the example of FIG. 2. At the same time, it will be understood that detection sensitivity is greatest when the frequency of the detected wave closely matches $f_{res}$ of the device 100, i.e. 1890 Hz in the example of FIG. 2. In such a case, and where high sensitivity is required, it may be suitable to monitor acoustic incidence angle across a narrower window, such as ±50°.

Because the power ratio shown is $P_A/P_B$, and not $P_B/P_A$, only a fractional response ($P_A/P_B<1$) is shown at positive angles. It will be understood that a curve of $P_B/P_A$ would be a mirror image of the curve of $P_A/P_B$, with a maximum at +50°. As shown in FIG. 2, the response is strongest at the resonance frequency, $f_{res}$, but is still substantial at frequencies 60 or more Hz distal from the resonance frequency. It will be understood that the signals obtained by the two microphones inside the chambers can be Fourier transformed to check incident pitch.

The results of FIG. 2 illustrate how a device 100 of the present teachings can detect incident angle of an acoustic wave, and how such a device can be incorporated into a system for sound source localization. A device 100 of the type shown in FIGS. 1A-1D can be placed in signal communication with a controller programmed to compare an incoming signal to a recorded response curve comparable to the curve shown in FIG. 2. It will be understood that, while vibration in the acoustic chamber 132A, 132B will be at the resonance frequency, the signals inside the chambers 132A, 132B can be Fourier transformed to determine the frequency of the incident wave. The system thus determines the incident angle, relative to the device 100, of an acoustic wave within a plane orthogonal to the longitudinal axis of the device 100, i.e. the x-y plane of FIGS. 1A-1D. This plane can be referred to as the "incident angle plane" of the device 100.

Figure 3A:
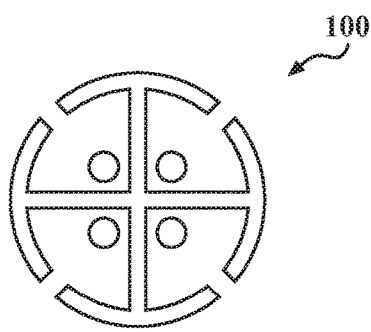
FIGS. 3A-3F are top plan views of various exemplary alternative acoustic direction sensors of the type shown in FIGS. 1A-1D.
Figure 3B:
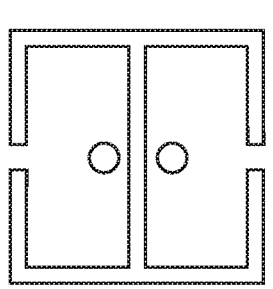
Figure 3C:
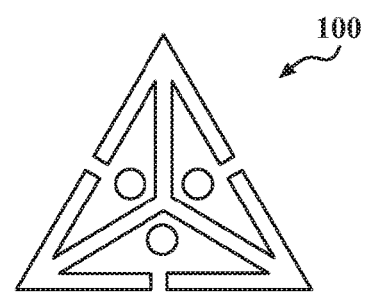
Figure 3D:
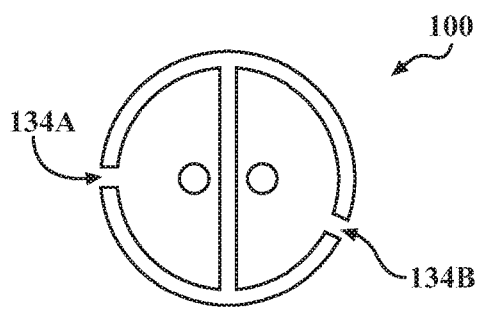
Figure 3E:
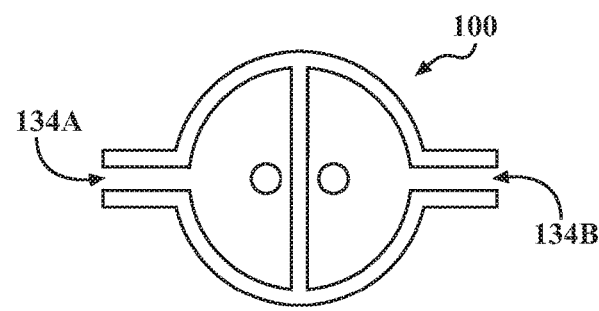
Figure 3F:
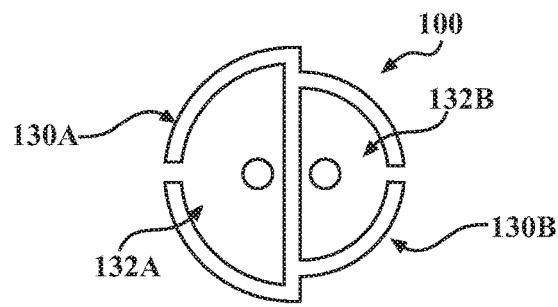

FIGS. 3A-3F show top plan views of some exemplary variations of the device of FIGS. 1A-1D. In certain implementations, such as the examples of FIGS. 3A-3C, the device 100 can have n-fold rotational symmetry about its longitudinal axis, where n is any integer equal to two or greater. In some such implementations, each of the Helmholtz resonators 130 can be rotationally equivalent to one another, having identical dimensions. As noted, such structures can include cylinders (FIG. 3A) but, as shown in FIGS. 3B and 3C, can also include equilateral polygonal prisms. It will be noted that FIGS. 3A and 3B also show examples in which the device 100 has more than two rotationally equivalent 11 Helmholtz resonators 130. While the examples of FIGS. 1A-1D and 3A-3C have necks 134 that are laterally centered in the resonators 130, the neck need not necessarily be centered, or need not be identically positioned in otherwise equivalent resonators 130, as shown in FIG. 3D. In some implementations, one or more necks 134 can extend outward (FIG. 3E) or extend into the associated chamber 132. In some instances, as shown in FIG. 3F, the resonators 130 can have non-identical dimensions relative to one another.

It will be understood that it is generally preferable for the multiple resonators 130 of a device 100 to have identical resonance frequency. Even if one or more resonators 130 of a device have non-identical dimensions, it will be understood that identical resonance frequency can be maintained by offsetting alteration to, for example, the chamber volume and the neck dimensions according to equation 4. For example, in a case of first and second Helmholtz resonators 130A, 130B, if the second resonator 130B has a chamber 132B with twice the volume, V, of that of the first chamber 132A, it can still have identical resonance frequency if its neck surface area, S, is also twice as large.

Figure 4:
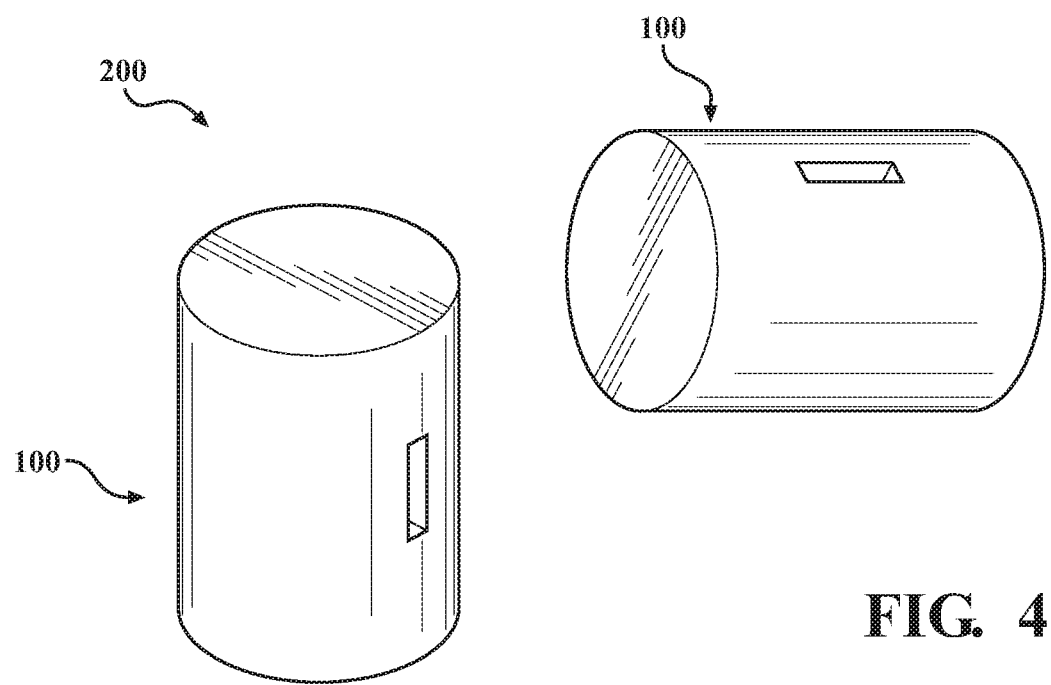
FIG. 4 is a side perspective view of a three dimensional acoustic direction apparatus having two orthogonally positioned sensors of the type shown in FIGS. 1A-1D.

It will be understood that devices 100 of the present teachings have a plane of effective sound direction detection that is orthogonal to the longitudinal axis of the device. Sound direction detection in three dimensions can thus be achieved by coupling two or more such devices 100. FIG. 4 shows a disclosed apparatus 200 for sound direction detection in three dimensions. The apparatus of FIG. 4 has two devices 100 of the type shown in FIGS. 1A-1D, positioned orthogonally relative to one another. Therefore their angle detection planes are also orthogonal relative to one another, and define a three-dimensional zone of acoustic wave incident angle detection.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A sound direction sensor, comprising:
   a first Helmholtz resonator comprising:
      at least one exterior wall defining a first acoustic chamber, and
      a first neck placing the first acoustic chamber in fluid communication with an ambient environment, the first neck pointing in a first direction;
   a first microphone positioned in the first acoustic chamber away from the at least one exterior wall;
   a second Helmholtz resonator having:
      a second acoustic chamber defined by the at least one exterior wall, and
      a second neck placing the second acoustic chamber in fluid communication with the ambient environment, the second neck pointing in a second direction different from the first direction;
   a second microphone positioned in the second acoustic chamber away from the at least one exterior wall; and
   wherein the first and second Helmholtz resonators are collinear with respect to each other.

2. The sound direction sensor as recited in claim 1, wherein at least one of the first microphone and second microphone is a condenser microphone.

3. The sound direction sensor as recited in claim 1, wherein the first and second directions are opposite one another.

4. The sound direction sensor as recited in claim 1, wherein the at least one exterior wall defines a cylinder, and each of the first and second Helmholtz resonators define a semi-cylinder.

5. The sound direction sensor as recited in claim 1, wherein the at least one exterior wall defines a polygonal prism.

6. The sound direction sensor as recited in claim 1, wherein the at least one exterior wall is formed of a thermoplastic.

7. The sound direction sensor as recited in claim 1, wherein the first neck defines a first entrance plane that is orthogonal to an orientation of the first Helmholtz resonator.

8. The sound direction sensor as recited in claim 7, wherein the second neck defines a second entrance plane that is orthogonal to an orientation of the second Helmholtz resonator.

9. The sound direction sensor as recited in claim 8, wherein an orientation of the first Helmholtz resonator and an orientation of the second Helmholtz resonator define a detection plane.

10. The sound direction sensor as recited in claim 9, wherein the first and second microphones are positioned such that a power ratio between the first and second microphones generated in response to an acoustic wave defines an incidence angle of the acoustic wave with respect to the detection plane.

11. A sound direction sensor comprising:
    at least one exterior wall defining a hollow longitudinal structure having a longitudinal axis and n-fold rotational symmetry about the longitudinal axis, where n is an integer equal to or greater than two;
    n rotationally equivalent Helmholtz resonators contained in the hollow longitudinal structure, each of the n rotationally equivalent Helmholtz resonators comprising:
       an acoustic chamber bounded by the at least one exterior wall, and
       a neck placing the acoustic chamber in fluid communication with an ambient environment;
    a microphone contained in the acoustic chamber away from the at least one exterior wall; and
    wherein the n rotationally equivalent Helmholtz resonators are collinear with respect to each other.

12. The sound direction sensor as recited in claim 11, wherein the sound direction sensor has a maximum length of less than about fifty millimeters.

13. The sound direction sensor as recited in claim 11, wherein the sound direction sensor has a maximum length of less than about ten millimeters.

14. The sound direction sensor as recited in claim 11, wherein the orientations of the n rotationally equivalent Helmholtz resonators define one or more detection planes.

15. The sound direction sensor as recited in claim 14, wherein the microphones are positioned such that one or more power ratios between the microphones generated in response to an acoustic wave defines one or more incidence angles of the acoustic wave with respect to the one or more detection planes.

\* \* \* \* \*